United States Patent
Zhao et al.

(10) Patent No.: US 12,259,937 B2
(45) Date of Patent: Mar. 25, 2025

(54) GRAPH-BASED DESIGN MAPPING AND FUNCTION ROUTE GENERATION

(71) Applicant: International Business Machines Corporation, Armonk, NY (US)

(72) Inventors: Rong Zhao, Beijing (CN); Zhe Yan, Beijing (CN); Li Li Guan, Beijing (CN); Hao Jia Li, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 18/178,716

(22) Filed: Mar. 6, 2023

(65) Prior Publication Data

US 2024/0303291 A1 Sep. 12, 2024

(51) Int. Cl.
*G06F 16/954* (2019.01)
*G06F 3/0482* (2013.01)
*G06F 3/0483* (2013.01)

(52) U.S. Cl.
CPC .......... *G06F 16/954* (2019.01); *G06F 3/0482* (2013.01); *G06F 3/0483* (2013.01)

(58) Field of Classification Search
CPC ..... G06F 16/954; G06F 3/0482; G06F 3/0483
See application file for complete search history.

(56) References Cited

U.S. PATENT DOCUMENTS

| | | |
|---|---|---|
| 6,898,764 B2 | 5/2005 | Kemp |
| 9,104,693 B2 | 8/2015 | Campbell et al. |
| 10,303,966 B2 | 5/2019 | Coulter et al. |
| 10,489,126 B2 | 11/2019 | Kumar et al. |
| 2005/0188357 A1 | 8/2005 | Derks et al. |

(Continued)

FOREIGN PATENT DOCUMENTS

| | | |
|---|---|---|
| CN | 105191387 B | 3/2018 |
| EP | 2096536 A2 | 9/2009 |

(Continued)

OTHER PUBLICATIONS

Siddique et al, "Product Platform Design: A Graph Grammar Approach," Proceedings of DETC'99: ASME Design Engineering Technical Conferences, Sep. 12-16, 1999, 12 pages.

*Primary Examiner* — Cao H Nguyen
(74) *Attorney, Agent, or Firm* — CANTOR COLBURN LLP; Sabo Stosch

(57) ABSTRACT

Embodiments relate to graph-based design mapping and function route generation. A computer-implemented method includes analyzing first user interfaces and second user interfaces to identify features of each user interface, where the second user interfaces include at least one change to the first user interfaces. A first graph representing the features of the first user interfaces and a second graph representing the features of the second user interfaces are generated. A function mapping is determined based on a similarity calculation between the first graph and the second graph. A node that satisfies an influence threshold is recommended to do limited manual labeling. The function mapping is updated based on the labeling. A visualization of the function mapping is created between the first user interfaces and the second user interfaces. Function route generation can be performed.

17 Claims, 12 Drawing Sheets

(56) References Cited

U.S. PATENT DOCUMENTS

| | | | | |
|---|---|---|---|---|
| 2009/0055748 | A1* | 2/2009 | Dieberger | G06Q 10/00 |
| | | | | 715/735 |
| 2013/0325319 | A1* | 12/2013 | Moore | G01C 21/3664 |
| | | | | 701/417 |
| 2013/0325340 | A1* | 12/2013 | Forstall | G01C 21/3667 |
| | | | | 715/810 |
| 2013/0339891 | A1* | 12/2013 | Blumenberg | G06F 16/9537 |
| | | | | 715/771 |

FOREIGN PATENT DOCUMENTS

| | | | | |
|---|---|---|---|---|
| WO | 2014051155 | A1 | 9/2014 | |
| WO | WO-2014151155 | A1 * | 9/2014 | G01C 21/36 |

* cited by examiner

```
┌─────────────────────────────────────────────────────────────────┐
│ ANALYZE A PLURALITY OF FIRST USER INTERFACES AND A PLURALITY OF │
│ SECOND USER INTERFACES TO EXTRACT A PLURALITY OF FEATURES OF    │
│ EACH USER INTERFACE, WHERE THE SECOND USER INTERFACES INCLUDE   │
│ AT LEAST ONE CHANGE TO THE FIRST USER INTERFACES    905         │
└─────────────────────────────────────────────────────────────────┘
                                 ↓
┌─────────────────────────────────────────────────────────────────┐
│ GENERATE A FIRST GRAPH REPRESENTING THE FEATURES OF THE FIRST   │
│ USER INTERFACES AND A SECOND GRAPH REPRESENTING THE FEATURES    │
│ OF THE SECOND USER INTERFACES    910                            │
└─────────────────────────────────────────────────────────────────┘
                                 ↓
┌─────────────────────────────────────────────────────────────────┐
│ DETERMINE A FUNCTION MAPPING BASED ON A SIMILARITY CALCULATION  │
│ BETWEEN THE FIRST GRAPH AND THE SECOND GRAPH    915             │
└─────────────────────────────────────────────────────────────────┘
                                 ↓
┌─────────────────────────────────────────────────────────────────┐
│ TRAVERSE THE FIRST GRAPH AND THE SECOND GRAPH TO RECOMMEND ONE  │
│ OR MORE NODES FOR LABELING BASED ON AN INFLUENCE AND COMPLEXITY │
│ DETERMINATION    920                                            │
└─────────────────────────────────────────────────────────────────┘
                                 ↓
┌─────────────────────────────────────────────────────────────────┐
│ UPDATE THE FUNCTION MAPPING BASED ON THE LABELING    925        │
└─────────────────────────────────────────────────────────────────┘
                                 ↓
┌─────────────────────────────────────────────────────────────────┐
│ CREATE A VISUALIZATION OF THE FUNCTION MAPPING BETWEEN THE      │
│ FIRST USER INTERFACES AND THE SECOND USER INTERFACES    930     │
└─────────────────────────────────────────────────────────────────┘
```

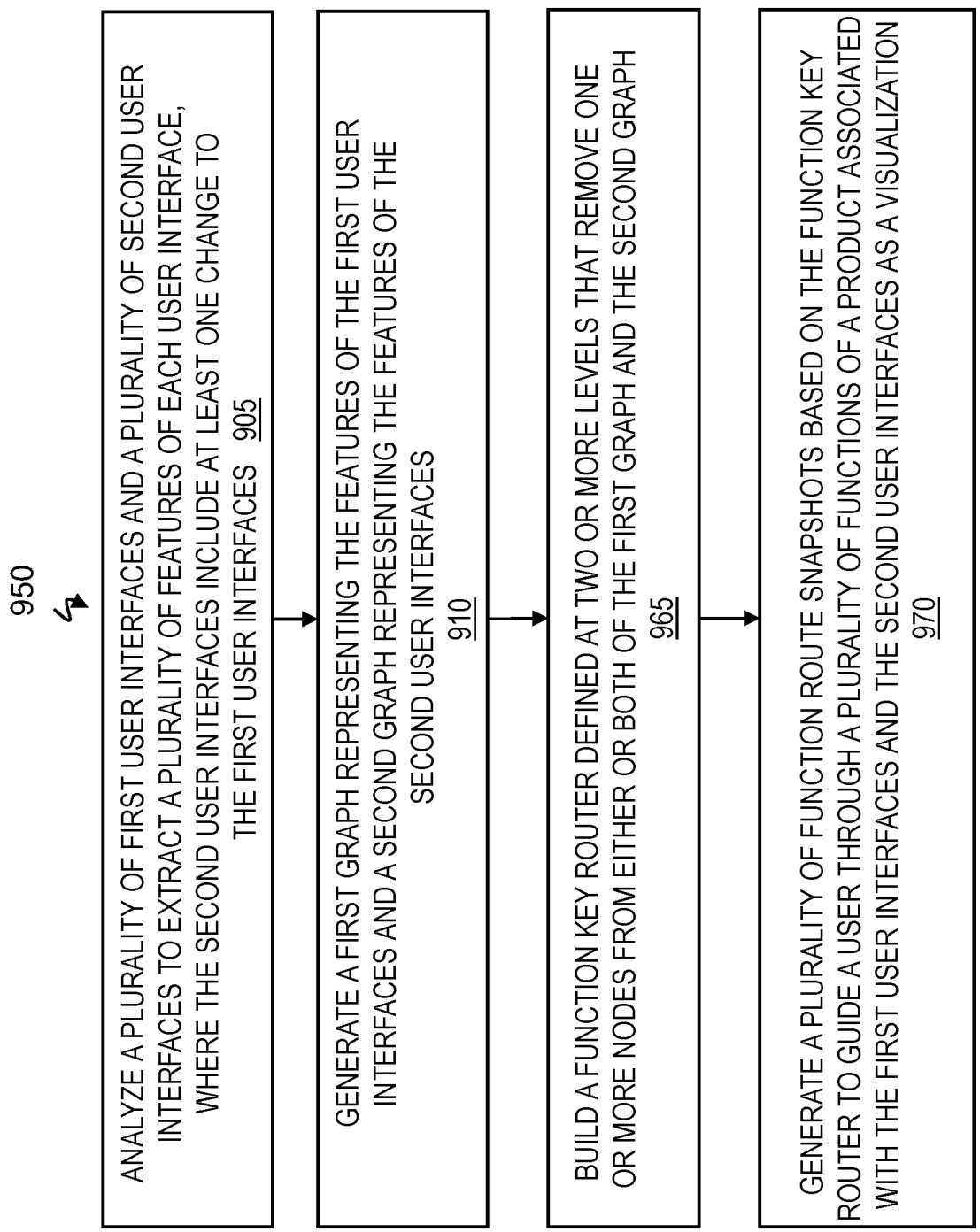

GRAPH-BASED DESIGN MAPPING AND FUNCTION ROUTE GENERATION

BACKGROUND

The present invention generally relates to computer systems, and more specifically, to computer-implemented methods, computer systems, and computer program products configured and arranged to perform graph-based design mapping and function route generation.

Software updates can change multiple aspects that impact functionality and user interfaces (UIs) between releases. For example, design changes can add functionality, remove functionality, or change the functionality of features between software version releases. Some changes may only impact the look and feel of a product, while other changes can impact functional features or structural organization of data, as well as transitions when navigating between features. Relying upon developers to accurately and consistently document the changes can result in errors and/or omissions. Further, manually generated documentation may assume that features of a software product are implemented differently than how the features are actually implemented. Thus, certain types of errors may not be readily discovered until after deployment.

In manual design change documentation, written summaries can be generated by developers or product managers to generally describe new features but may not capture specific information about each change or new feature and the navigation impact. For instance, if an existing feature of a user interface is moved to a different interface, this may not be captured in documentation as the same feature still exists although reaching the feature may require a different set of navigational steps. Further, while new features may be described, the removal of previous features may not be captured in the documentation, as the documentation may focus on content that is in a new release rather than what was removed. However, users familiar with the previous version may not readily be able to determine whether a change moved a feature to another interface or removed it entirely without making many attempts to navigate through multiple interfaces. This effort to navigate through multiple interfaces can result in increased computational load and network traffic by triggering interactions due to the user exploring aspects of the software product that would not otherwise be used in attempts to understand the changes from a previous version.

SUMMARY

Embodiments of the present invention are directed to computer-implemented methods for graph-based design mapping of user interface changes. A computer-implemented method includes analyzing, by a user interface analysis tool executing on a processing system, a plurality of first user interfaces and a plurality of second user interfaces to identify a plurality of features of each user interface, where the second user interfaces include at least one change to the first user interfaces. The user interface analysis tool generates a first graph representing the features of the first user interfaces and a second graph representing the features of the second user interfaces. The user interface analysis tool determines a function mapping based on a similarity calculation between the first graph and the second graph. The user interface analysis tool recommends a node that satisfies an influence threshold to do limited manual labeling to help identify mapping relations between the first and second graphs based on an influence and complexity determination through traversing the first graph and the second graph, where the user interface analysis tool is unable to generate a new mapping relationship using the similarity calculation between the first and second graphs. The user interface analysis tool updates the function mapping based on the labeling. The user interface analysis tool creates a visualization of the function mapping between the first user interfaces and the second user interfaces. Advantages can include visualized mapping between multiple versions of user interfaces to highlight updates.

According to an aspect, a system includes a memory and a processing device coupled to the memory. The processing device is configured to execute instructions to analyze a plurality of first user interfaces and a plurality of second user interfaces to identify a plurality of features of each user interface, where the second user interfaces include at least one change to the first user interfaces. The processing device is further configured to execute instructions to generate a first graph representing the features of the first user interfaces and a second graph representing the features of the second user interfaces, determine a function mapping based on a similarity calculation between the first graph and the second graph, recommend a node that satisfies an influence threshold to do manual labeling to help identify mapping relations between the first and second graphs based on an influence and complexity determination through traversing the first and second graphs, where a new mapping relationship is unable to be generated using the similarity calculation between the first and second graphs, update the function mapping based on the labeling, and create a visualization of the function mapping between the first user interfaces and the second user interfaces. Advantages can include highlighting function variations between multiple versions of user interfaces.

According to an aspect, a computer program product includes a computer readable storage medium having program instructions embodied therewith, the program instructions are executable by one or more processors to cause the one or more processors to perform operations. The operations include analyzing a plurality of first user interfaces and a plurality of second user interfaces to identify a plurality of features of each user interface, where the second user interfaces include at least one change to the first user interfaces. The operations further include generating a first graph representing the features of the first user interfaces and a second graph representing the features of the second user interfaces, building a function key router defined at two or more levels that remove one or more nodes from either or both of the first graph and the second graph, and generating a plurality of function route snapshots based on the function key router to guide a user through a plurality of functions of a product associated with the first user interfaces and the second user interfaces as a visualization. Advantages can include identifying function route snapshots through user interfaces and simplifying information captured in graphs including path routes that span multiple subgraphs to illustrate a navigation path through multiple features.

Further aspects can include where the user interface analysis tool analyzes a screen snapshot of each of the first user interfaces and the second user interfaces to identify the features. Advantages can include offline user interface analysis, where screenshots captured through other user interface sessions can be separately analyzed without requiring both the user interface analysis tool and the user interfaces to be used at the same time.

Further aspects can include where the influence determination is performed by determining whether a node is a core semantic element and whether the node includes an event to jump to another page. Advantages can include scaling an influence score for a node based on a potential impact of the node.

Further aspects can include where the complexity determination is performed by determining whether the node includes one or more factors based on properties, events, brotherhood, and jumping connections. Advantages can include scaling a complexity score for a node based on predetermined complexity factors.

Further aspects can include determining mapping deductions based on the function mapping that includes a function mapping list. Advantages can include generating a consolidate list of function mapping information to ensure that the user interfaces are completely analyzed and distinguish between changes and unchanged features.

Further aspects can include identifying a new function of the second user interfaces and creating a record of the new function in a new function list of the mapping deductions. Advantages can include generating a consolidated list of new functions for understanding and verification that expected new functions are included in the second user interfaces.

Further aspects can include identifying an obsolete function of the first user interfaces and creating a record of the obsolete function in an obsolete function list of the mapping deductions. Advantages can include generating a consolidated list of obsolete functions for understanding and verification that expected obsolete functions of the first user interfaces have been removed from the second user interfaces.

Further aspects can include summarizing the new function list and the obsolete function list in the visualization of one or more changes between the first user interfaces and the second user interfaces. Advantages can include automated documentation generation for changes, additions, and removal of functions in a newer version of a user interface.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 depicts a flow diagram of a method to perform graph-based design mapping of user interface changes according to one or more embodiments of the present invention;

FIG. 10 depicts a flow diagram of a method to perform graph-based function route snapshot determination of user interfaces according to one or more embodiments of the present invention.

DETAILED DESCRIPTION

Various technical benefits and technical solutions are provided by techniques, processes, devices, and systems for graph-based design mapping of user interface changes. As software products are updated, graphical user interfaces can change between versions. The changes can impact placement of user interface features, interaction options, underlying functions, and navigation between multiple user interfaces. Complex software products that involve many user interfaces that may be accessible through a navigation sequence can add to the challenge of understanding where changes occurred or locating a desired feature when the navigation path to the feature changes. Developers or managers can attempt to document the changes in written text, but the resulting text may be difficult for users to understand when describing graphical features, underlying functions, and transition sequences.

According to aspects of the present disclosure, a method for graph-based design mapping and/or function route generation associated with user interface changes is provided. Embodiments can automate identification of product function changes and transitions between different versions of software. Generating a visual output can summarize changes to enhance understanding and verify that desired changes were implemented. Visualizations can include generation of function routes that illustrate paths through related functions and can guide navigation to reach a targeted feature. Embodiments can analyze user interface elements of an old design and a new design and perform a graph based analysis to identify changes. Core semantic objects can be identified through user interface elements including action scope objects and semantic correlations, for example. Local graphs can be built that represent user interface elements based on correlations between properties and events of user interface entities. A global graph can be formed that combines local graphs based on correlations between multiple local graphs. By performing graph creation for both an old user interface and a new user interface, a common base can be established for comparisons to identify changes. Resulting global graphs can be simplified to identify function routes to navigate through multiple elements to reach a function that may be identified as a key function.

Figure 1:
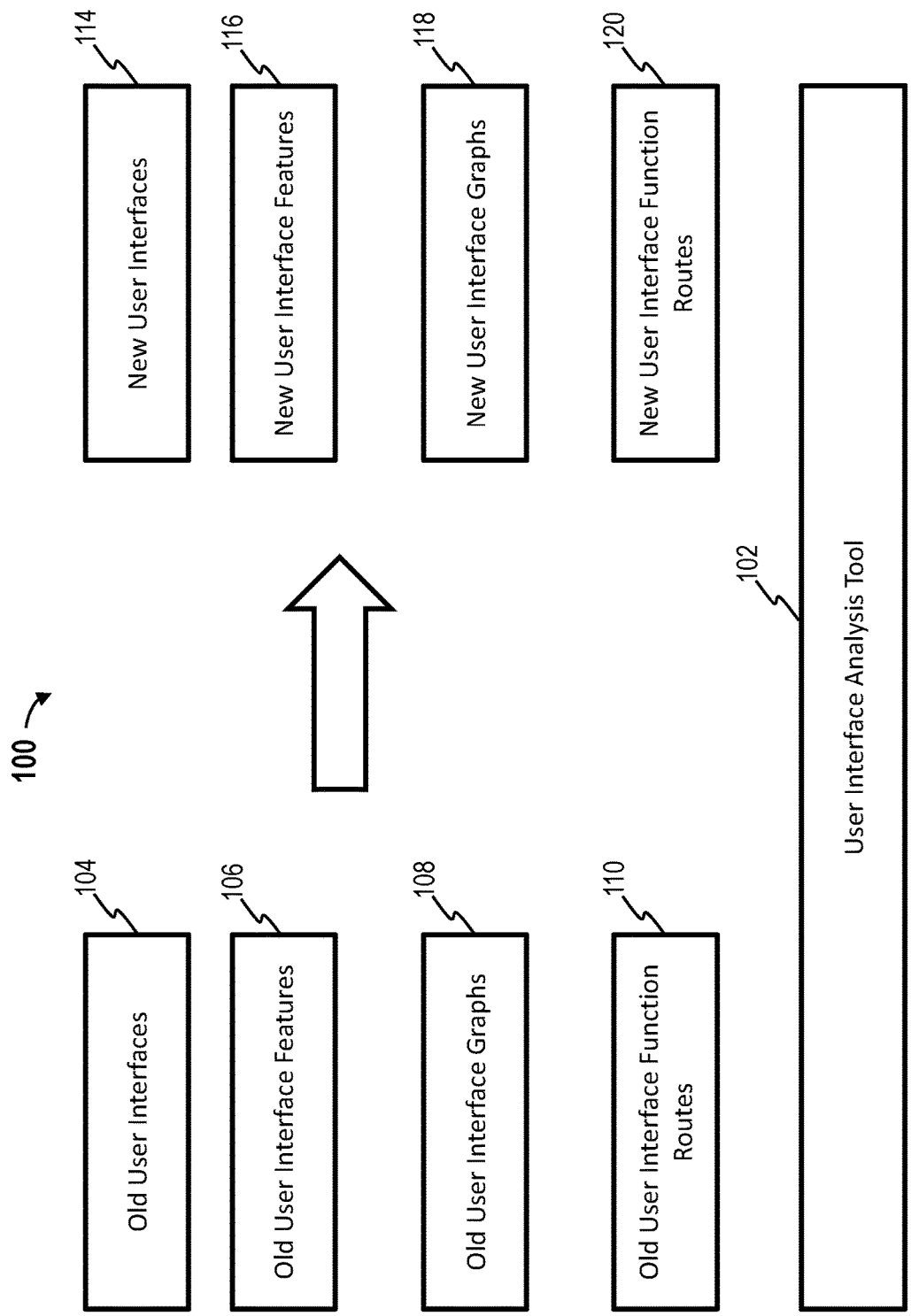
FIG. 1 depicts a block diagram of a system for graph-based design mapping of user interface changes according to one or more embodiments of the present invention.

FIG. 1 depicts a high-level block diagram of an illustrative example of a system 100 for graph-based design mapping of user interface changes and/or function route mapping. In the example of FIG. 1, the system 100 includes a user interface analysis tool 102 that executes on a processing system. The user interface analysis tool 102 can analyze an old user interfaces 104 to identify old user interface features 106. The old user interfaces 104 can include one or more screen capture images of an earlier version of a software product. The user interface analysis tool 102 can generate an old user interface graph 108 that captures relationships between the old user interface features 106. The user interface analysis tool 102 can simplify the old user interface graph 108 into old user interface function routes 110 that capture route snapshots through the old user interface graph 108 at different levels as visualizations. The user interface analysis tool 102 can also analyze a new user interfaces 114 to identify new user interface features 116, where the new user interfaces 114 is a change to the old user interfaces 104. The new user interfaces 114 can include one or more screen capture images of a newer version of the software product. The user interface analysis tool 102 can generate a new user interface graph 118 that captures relationships between the new user interface features 116. The user interface analysis tool 102 can simplify the new user interface graph 118 into new user interface function routes 120 that capture route snapshots through the new user interface graph 118 at different levels as visualizations.

The user interface analysis tool 102 can determine a function mapping based on a similarity calculation between the old user interface graph 108 and the new user interface graph 118. The user interface analysis tool 102 can create a visualization of one or more changes between the old user interfaces 104 and the new user interfaces 114 based on the function mapping. The visualization can illustrate additions, removals, and changes between various features and function routes of the old user interfaces 104 and the new user interfaces 114. The visualizations can assist with understanding changes and improving user interface navigation. Further, the visualizations can assist with verification to confirm that desired updates to the old user interfaces 104 have been correctly implemented in the new user interfaces 114.

Figure 2:
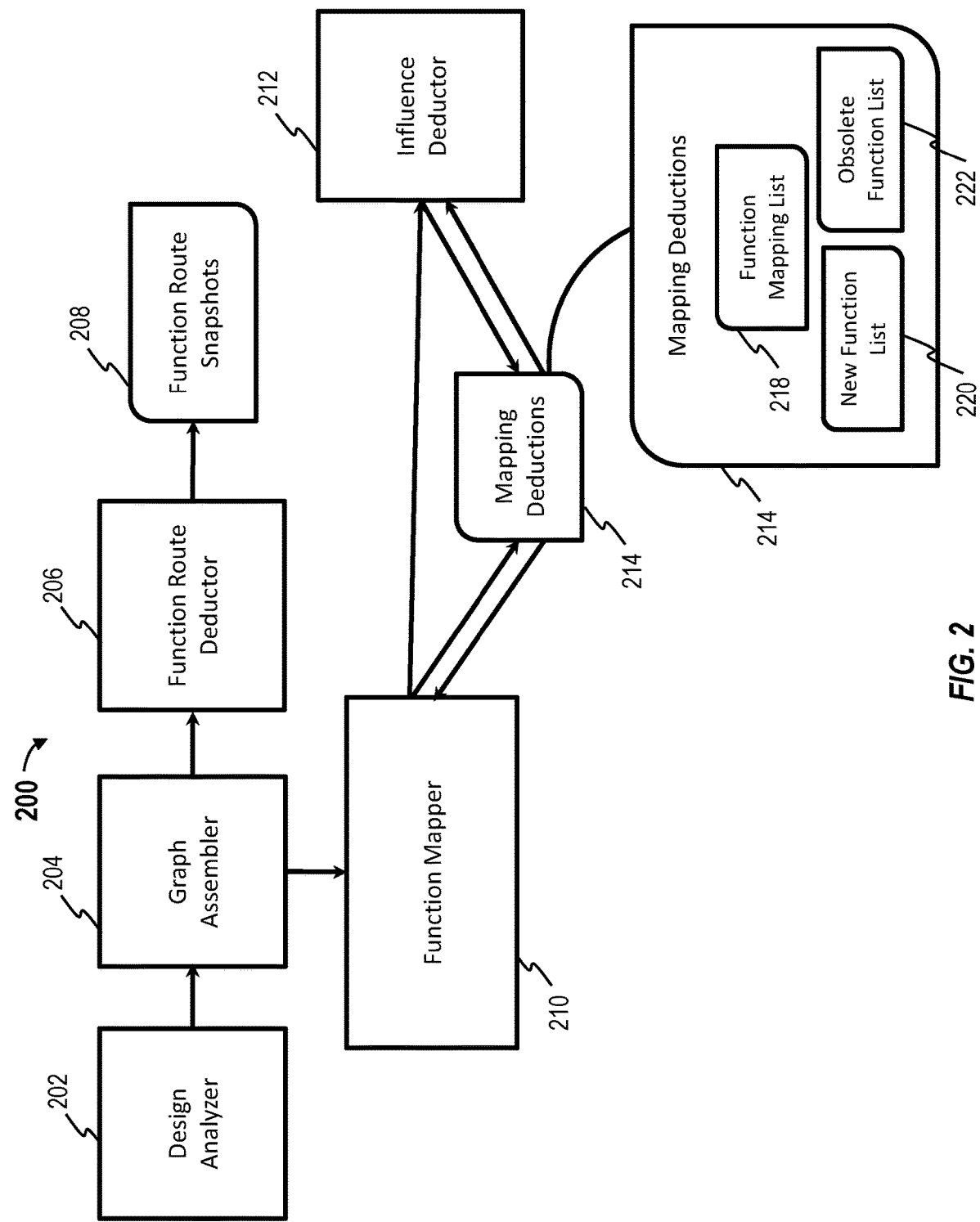
FIG. 2 depicts a process for a flow of graph-based design mapping and function route generation according to one or more embodiments of the present invention.

FIG. 2 depicts a process 200 for a flow of graph-based design mapping and function route generation according to one or more embodiments. The process 200 can use a design analyzer 202 to analyze the old user interfaces 104 and the new user interfaces 114 of FIG. 1 to extract features and produce elements for use by a graph assembler 204. The graph assembler 204 can assemble local graphs based on the elements identified by the design analyzer 202. The graph assembler 204 can perform feature fusion to assemble the local graphs and compose a global graph that associates multiple local graphs. A function route deductor 206 can simplify the global graph into function route snapshots 208. The process 200 can also use a function mapper 210 to map subgraphs in the global graph using a hierarchy and a granularity mapping model that results in mapping deductions 214. The mapping deductions 214 can include a function mapping list 218, a new function list 220, and an obsolete function list 222. An influence deductor 212 can use the output of the function mapper 210 and the mapping deductions 214 to determine influence and complexity based on a scoring model. The influence deductor 212 can recommend the elements that satisfy an influence threshold from the graphs. In some examples, the influence threshold may be the element that is identified to have the highest influence, such that the element with the highest influence is recommended. The function mapper 210 and the influence deductor 212 can be applied to the old user interface graph 108 and the new user interface graph 118 to get mapping results between user interfaces and to populate or update the function mapping list 218, the new function list 220, and the obsolete function list 222. The design analyzer 202, graph assembler 204, function route deductor 206, function mapper 210, and influence deductor 212 can be components or modules of the user interface analysis tool 102 of FIG. 1.

Figure 3:
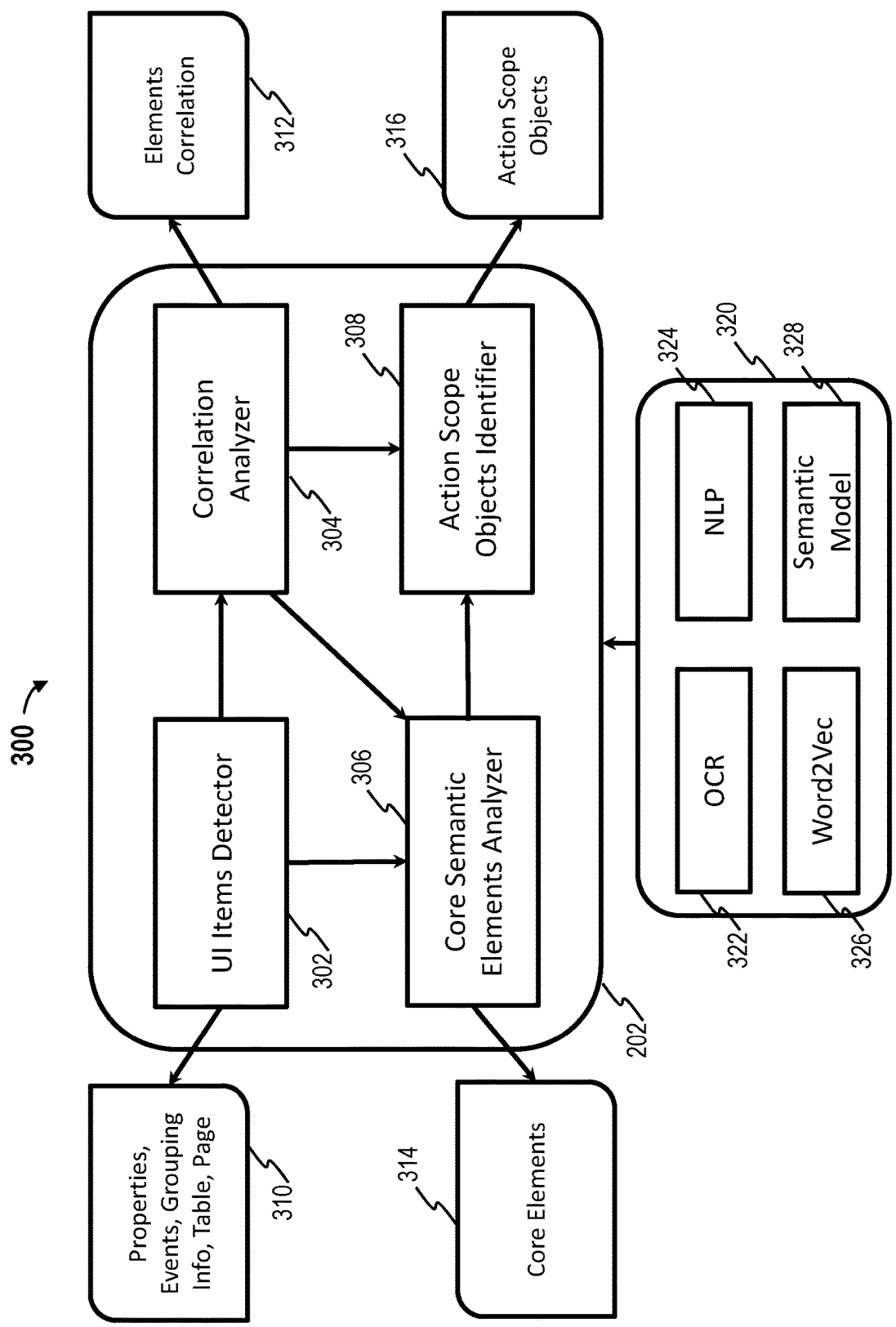
FIG. 3 depicts a block diagram of a design analyzer according to one or more embodiments of the present invention.

FIG. 3 depicts a block diagram 300 of design analyzer 202 according to one or more embodiments. In the example of FIG. 3, the design analyzer 202 can include a user interface items detector 302, a correlation analyzer 304, a core semantic elements analyzer 306, and an action scope objects identifier 308. The user interface items detector 302 can determine properties, events, grouping information, table, and/or page as element characteristics 310. The element characteristics 310 of the user interface items detector 302 can be provided to the correlation analyzer 304 and/or the core semantic elements analyzer 306. The correlation analyzer 304 can generate an elements correlation 312 and provide correlation data to the core semantic elements analyzer 306 and/or action scope objects identifier 308. The core semantic elements analyzer 306 can determine one or more core elements 314 and provide core element information to the action scope objects identifier 308. The action scope objects identifier 308 can generate one or more action scope objects 316.

Various input processing tools 320 can be used to extract features from a user interface, such as the old user interfaces 104 and/or the new user interfaces 114. For example, where screen snapshots are captured as images of user interfaces, optical character recognition 322 can be used to identify characters and words in image data. Once words are extracted, natural language processing 324 can be used to normalize words and phrases. Word2Vec 326 can be used to extract relatedness of words, synonym detection, concept categorization, preferences, analogy, and other such vector similarity determinations. Semantic model 328 can add meaning to the extracted words and phrases.

As an example, the design analyzer 202 can analyze user interface components and style based on user interface libraries. The optical character recognition 322 can use image recognition to extract text, icons, frontend controls, and relative coordinates. Semantic analysis performed by the natural language processing 324, Word2Vec 326, and/or semantic model 328 can identify elements with type, action/event, and/or action scope objects. Based on relative coordinates (e.g., x-y position on screen/page), size, color and style, type, correlations including grouping, parent-child, and/or brotherhood can be determined. Core element predictions can be performed through title analysis via verb plus object to identify an object. As an example, "Edit User→User" can indicate a relationship. Multiple classifications can be performed based on natural language processing supervised learning. A corpus and labeled data of a product can be used for classification. As one example, extracted elements and correlations can be stored in a file, such as JSON file, that can define elements in terms of type and relative coordinates and correlations in terms of links, parent and child relationships, and/or grouping and brotherhood relationships.

A library of known interface elements and icons can be used to assist the extraction process. For instance, a magnifying glass icon can be extracted as a search feature, a box next to a text label may be identified as a checkbox, a filter icon can be extracted as a filter feature, an "add user+" box can be extracted as an add user feature, a grid of items can be extracted as a table feature with column and/or row labels based text positioning. Other examples of identifiable icons that can be determined through an icon library may include an upload icon, a download icon, a setup/configuration icon, a help icon, an active status icon, an inactive status icon, page navigation icons, a switch icon, a save button, a cancel button, and other such icons or symbols. Column labels can be used to identify data descriptions, such as a user name, a full name, an email address, a language, a role, a status, a permission, a description, an assignment, an exclusion, and other such information. The design analyzer 202 can be trained through machine learning with labeled examples of known user interfaces to assist in feature extraction and semantic element identification.

Figure 4:
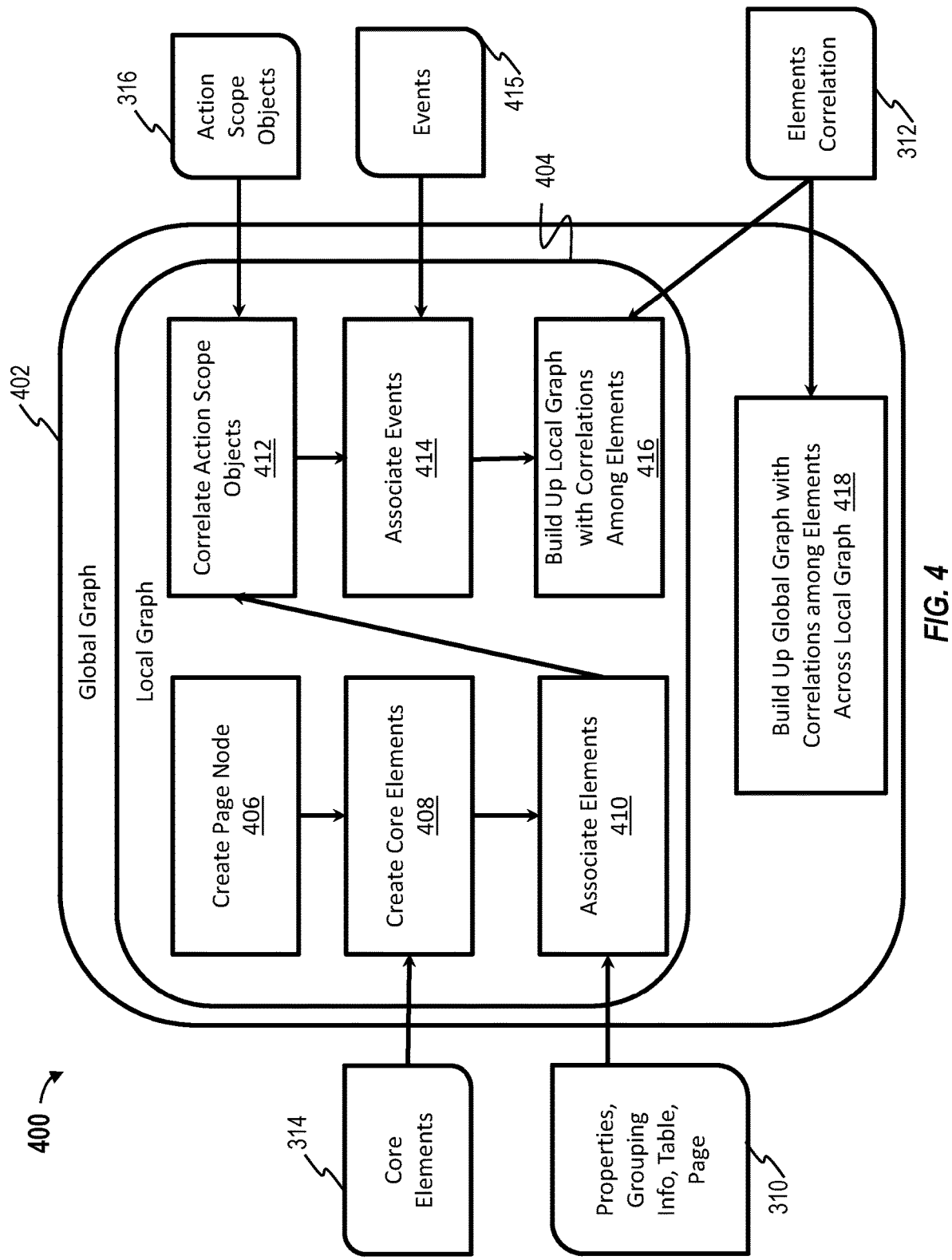
FIG. 4 depicts a block diagram of a graph assembler according to one or more embodiments of the present invention.

FIG. 4 depicts a block diagram of a graph assembler 400 according to one or more embodiments. Graph assembler 400 is an example of the graph assembler 204 of FIG. 2. The graph assembler 400 can form a global graph 402 based on one or more local graphs 404. Local graphs 404 may be constructed through a plurality of components or modules that can include create page node 406, create core elements 408, associate elements 410, correlate action scope objects 412, associate events 414, and build up local graph with correlations among elements 416. Global graph creation can include components or modules, such as module 418 to build up the global graph 402 with correlations among elements across one or more local graphs 404. The create page node 406 can create a higher-level user interface node. Core elements 314 can be used by create core elements 408 for association with element characteristics 310 in associate elements 410. Correlate action scope objects 412 can receive input from associate elements 410 and action scope objects 316 to provide input to associate events 414. Associate events 414 can access events 415 to provide event association information to build up local graph with correlations among elements 416. Elements correlation 312 can be used by both build up local graph with correlations among elements 416 and module 418 to build up the global graph 402 with correlations among elements across local graphs.

As an example, the graph assembler 400 can receive element characteristics 310, elements correlation 312, core elements 314, and action scope objects 316 from the design analyzer 202 for a user interface that depicts management of users and management of roles and permissions. The graph assembler 400 can form a first local graph as a user table that defines user information and actions that can be performed on a single row of the user table. The graph assembler 400 can also identify an assigned roles table in the user interface and build a second local graph for an assigned roles table that defines user roles with actions that can be performed on a single row of the assigned roles table. The graph assembler 400 can link the two local graphs into a global graph that associates the first and second local graphs as members of the "manage users page" user interface. As additional user interfaces are examined for the same software version release, additional local graphs can be built and relationships established to form connections in the global graph. For instance, an action of the assigned roles table can be to edit permissions, and another user interface can be a permissions dialogue that is linked to an assigned permissions table which can be captured in a third local graph. A relationship can be established in the global graph that links the second local graph and the third local graph through permissions. Another user interface can be a manage roles and permissions page that includes a local graph for a roles table and a local graph for an assigned permissions table. Links between the role of the assigned roles table and the roles table can be identified as a relationship between the local graphs of different user interface pages. Similarly, links between the permission of the assigned permissions table of the permissions dialogue and the assigned permissions table of the manage roles and permissions page can be identified as a relationship between the local graphs of different user interfaces. Similar approaches can be taken to form both the old user interface graph 108 of FIG. 1 as a first global graph and the new user interface graph 118 of FIG. 1 as a second global interface graph.

Figure 5:
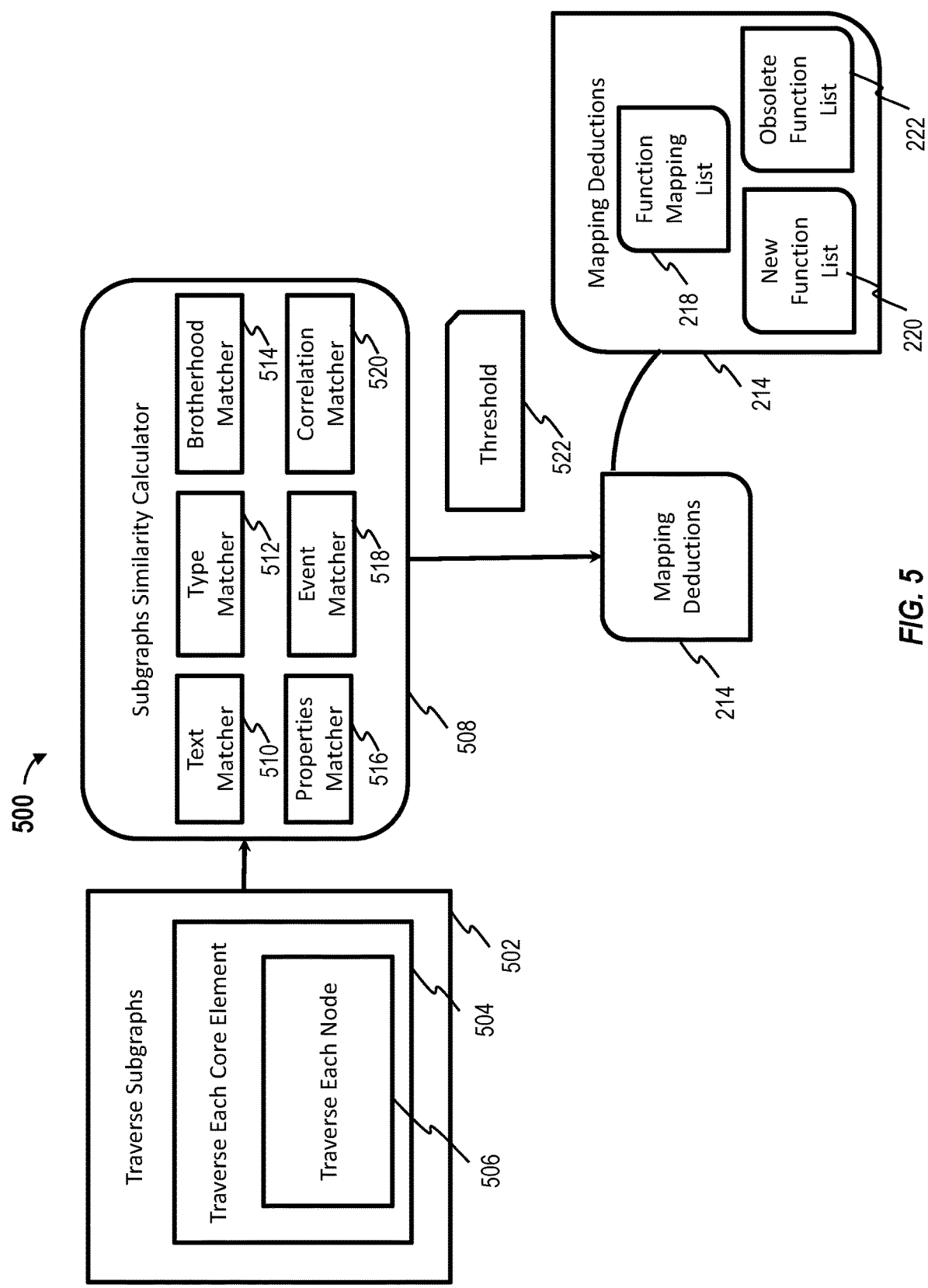
FIG. 5 depicts a block diagram of a function mapper according to one or more embodiments of the present invention.

FIG. 5 depicts a block diagram of a function mapper 500 according to one or more embodiments. The function mapper 500 is an example of the function mapper 210 of FIG. 2. In the example of FIG. 5, the function mapper 500 includes a traverse subgraphs component 502 with a traverse each core element component 504 and a traverse each node component 506. The traverse each core element component 504 can analyze core elements 314 associated graph portions, and the traverse each node component 506 can traverse through each graph node of the graph portions (e.g., subgraphs) through a global graph that can link parts of multiple local graphs. A subgraphs similarity calculator 508 can include a text matcher 510, a type matcher 512, a brotherhood matcher 514, a properties matcher 516, an event matcher 518, an a correlation match 520. Components 510-520 of the subgraphs similarity calculator 508 can determine similarity parameters such as name, type, properties, brotherhood, correlations, influence range, events that are weighted and tuned to calculate similarity for subgraphs of a global graph. Similarity tuning can adjust weights to find a highest correlation between mapping subgraphs. Similarity tuning can use a configurable threshold 522 that defines one or more limits for similarity comparisons. Results of the similarity comparison can be captured in mapping deductions, for instance, as part of the function mapping list 218.

Figure 6A:
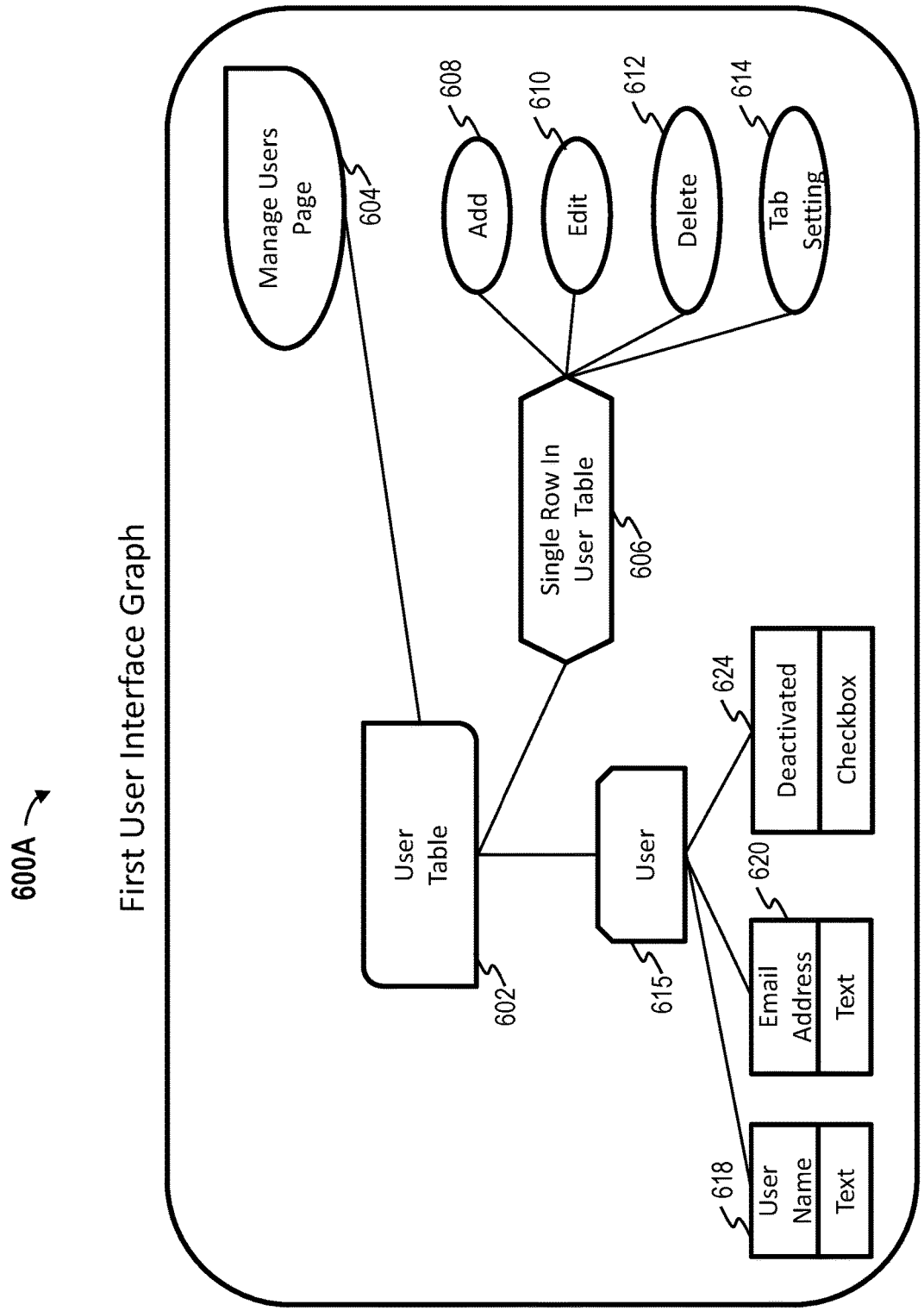
FIG. 6A depicts a block diagram of a first user interface graph according to one or more embodiments of the present invention.

FIG. 6A depicts a block diagram of a first user interface graph 600A according to one or more embodiments. The first user interface graph 600A includes a user table 602 that is associated with a manage users page 604. The user table 602 includes single row in user table actions 606 of add 608, edit 610, delete 612, and tab setting 614. The user table 602 also includes user rows 615 with a user name element 618, an email address element 620, an account locked element 622, and a deactivated element 624. Each of the elements 618-624 can have a derived data type, such as text for the user name element 618 and email address element 620 and checkbox for the account locked element 622 and deactivated element 624.

Figure 6B:
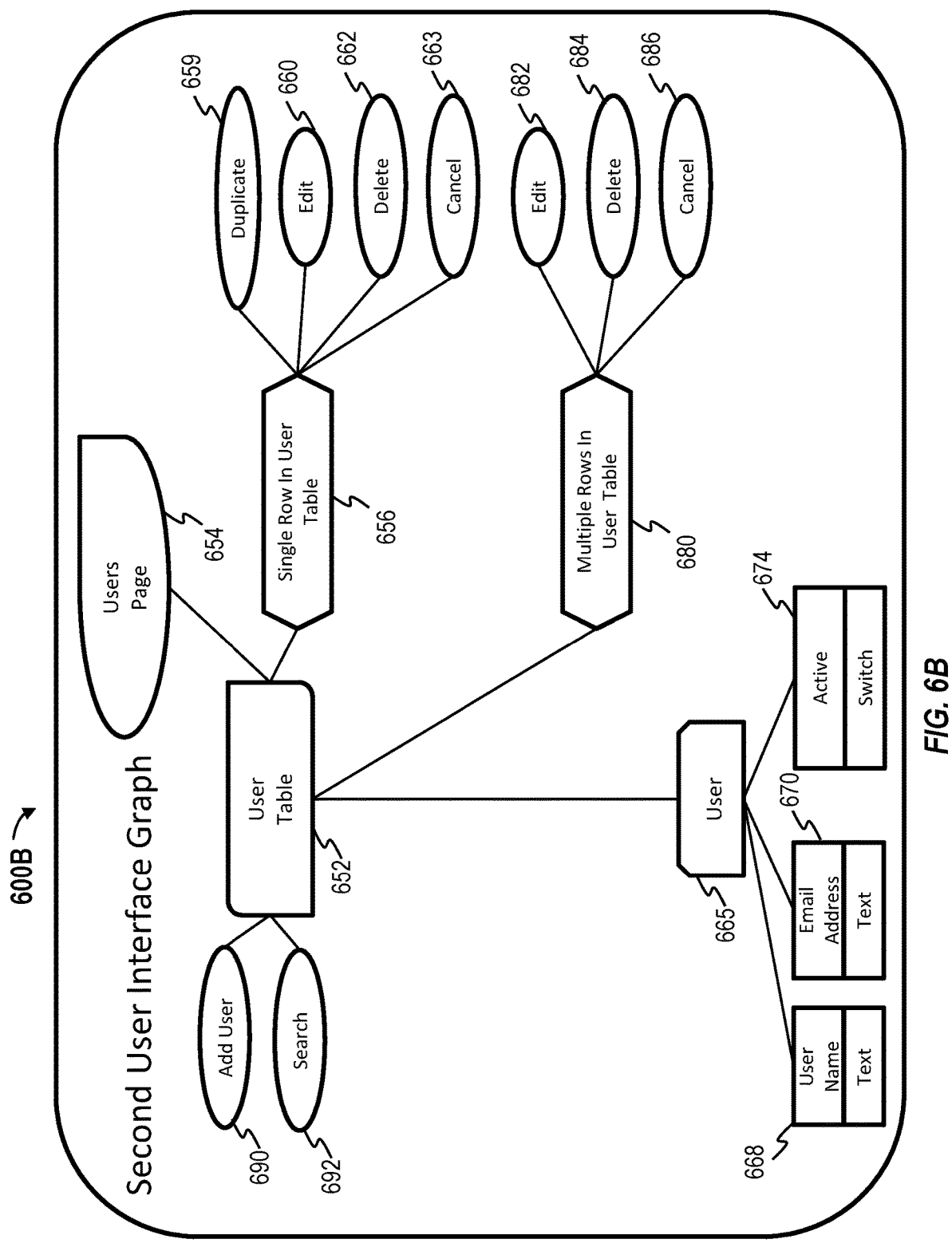
FIG. 6B depicts a block diagram of a second user interface graph according to one or more embodiments of the present invention.

FIG. 6B depicts a block diagram of a second user interface graph 600B according to one or more embodiments. The second user interface graph 600B includes a user table 652 that is associated with a users page 654. The user table 652 includes single row in user table actions 656 of duplicate 659, edit 660, delete 662, and cancel 663. The user table 652 also includes user rows 665 with a user name element 668, an email address element 670, and an active element 674. Each of the elements 668-674 can have a derived data type, such as text for the user name element 668 and email address element 670, and switch for active element 674. The user table 652 can also include multiple rows in user table actions

680 of edit 682, delete 684, and cancel 686. The user table 652 can include direct actions, such as add user 690 and search 692.

In comparing the first user interface graph 600A with the second user interface graph 600B, the function mapper 210 can identify new elements in the second user interface graph 600B to add to the new function list 220, removed elements to include in the obsolete function list 222, along with changed and unchanged elements in the function mapping list 218. Nodes can be isolated and mapped between the first user interface graph 600A and the second user interface graph 600B. For instance, both the first user interface graph 600A and the second user interface graph 600B have corresponding nodes for single row in user table actions 606, 656 with edit 610, 660 and delete 612, 662. Duplicate 659 and cancel 663 represent new nodes in the second user interface graph 600B. Add 608 in the first user interface graph 600A appears with a different relationship as add user 690 in the second user interface graph 600B. Tab setting 614 is obsolete and not included in the second user interface graph 600B. Some changes can be identified by semantics and similarity matching, such as changing deactivated element 624 as a checkbox to active element 674 as a switch. Function mapping can traverse each of the first user interface graph 600A and the second user interface graph 600B to make determinations about nodes and subgraphs.

Figure 7:
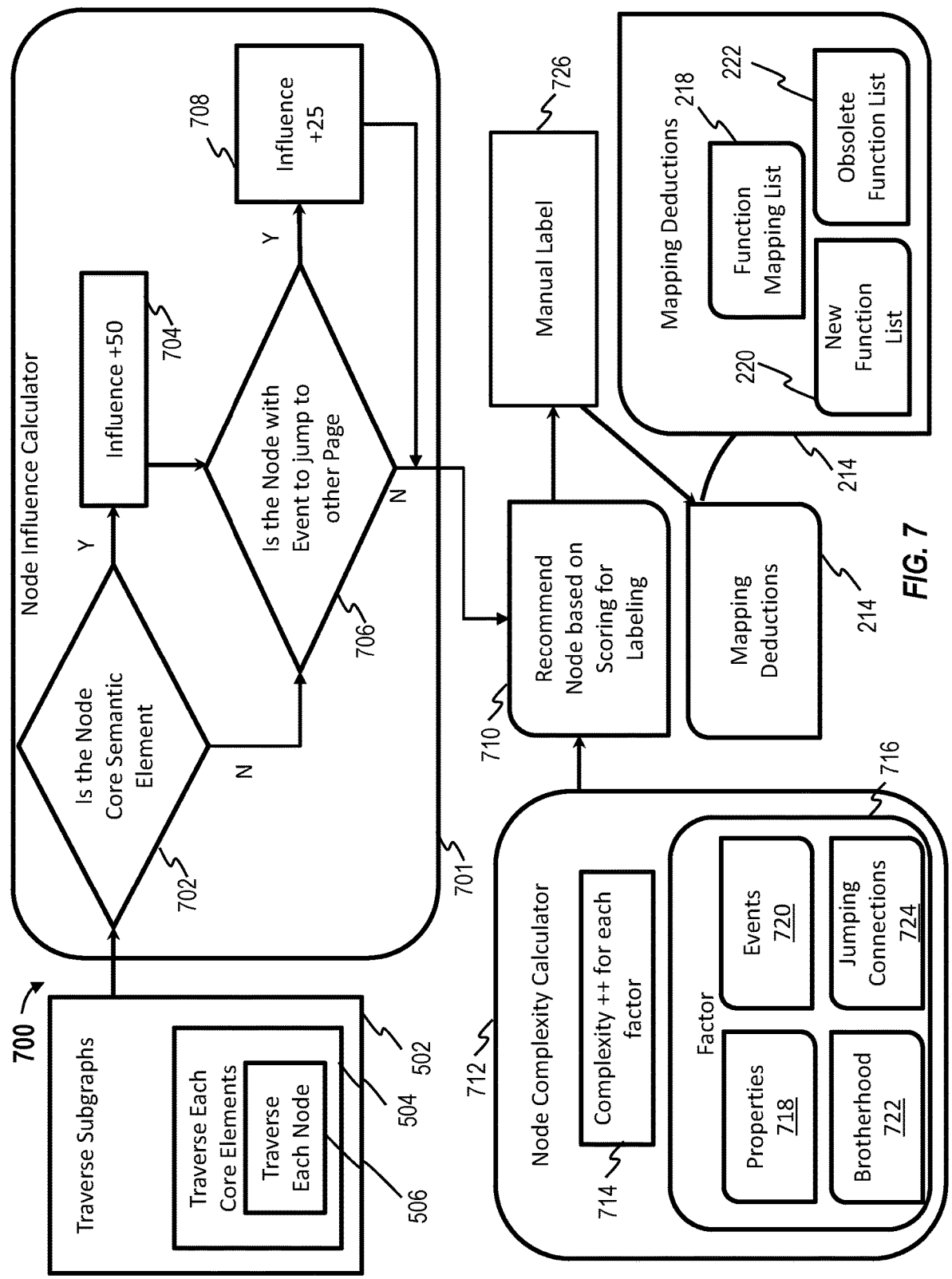
FIG. 7 depicts a block diagram of an influence deductor according to one or more embodiments of the present invention.

FIG. 7 depicts a block diagram 700 of an influence deductor 212 according to one or more embodiments. The influence deductor 212 can include a node influence calculator 701 that determines influence scores of nodes in a graph. For instance, the traverse subgraphs component 502 with traverse each core element component 504 and traverse each node component 506 can analyze subgraphs and pass node information to the node influence calculator 701. The node influence calculator 701 can determine, at block 702, whether a node is a core semantic element and if so increment an influence score by fifty, as an example, at block 704. The node influence calculator 701 can also determine whether the node includes an event to jump to another page (e.g., another user interface) at block 706, and if so, increment the influence score by twenty-five, as an example, at block 708. The results of the node influence calculator 701 can be provided to a recommendation block 710.

A node complexity calculator 712 can increment a complexity score by a configurable amount at block 714 for each factor 716, such as properties 718, events 720, brotherhood 722, and jumping connections 724. The factors can have higher impact on complexity based on weighted values of the properties 718, events 720, brotherhood 722, and jumping connections 724. For instance certain properties can be predetermined to have a greater complexity when populated with a value. Similarly, predetermined types of events 720 can have a greater complexity. Brotherhood 722 can indicate a number of related nodes on a same graph level as a node under analysis. Jumping connections 724 can identify one or more links to other pages or user interfaces. The recommendation block 710 can compare resulting influence scores from the node influence calculator 701 and complexity scores from the node complexity calculator 712 to respective thresholds (e.g., an influence threshold and/or a complexity threshold) to determine whether the node should be recommended for manual labeling 726. Further, a single combined value or weighted value of the influence and complexity can be determined and compared against a single threshold, which may be an influence threshold that accounts for complexity scores in combination with influence scores. Nodes above a threshold level can be recommended for manual labeling 726. Manual labeling 726 can flag nodes that have high level of influence and/or complexity relative to other nodes in a graph where uncertainty may exist as to whether a node is new or changed, for instance. In some aspects, sorting of scores for influence and/or complexity can be performed and one or more nodes having the highest scores can be selected for manual labeling 726. Results of manual labeling 726 can be used to update the mapping deductions 214. Manual labeling 726 can add labels that are then processed by machine learning during analysis and deductions.

Figure 8:
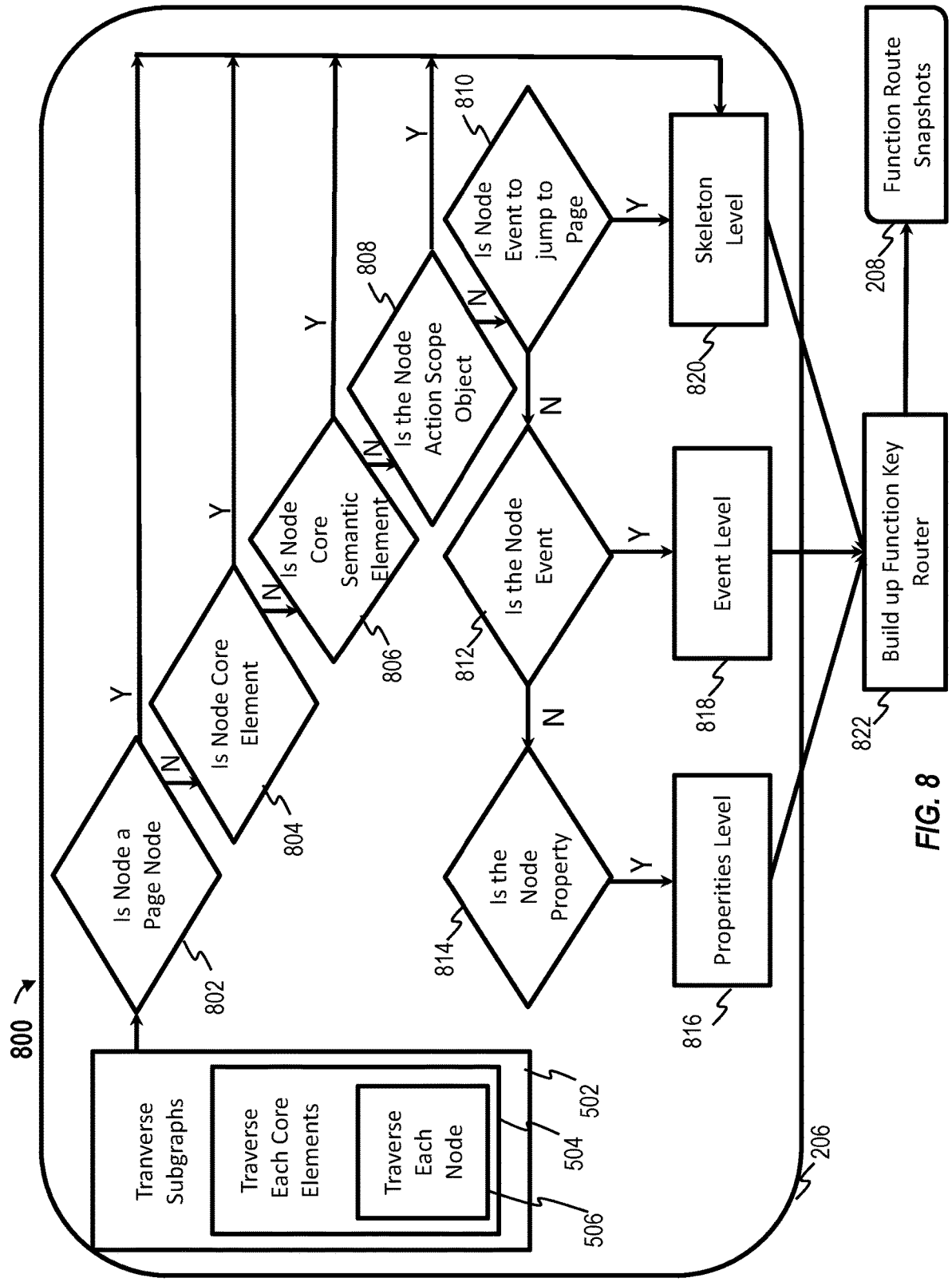
FIG. 8 depicts a block diagram of a function route deductor according to one or more embodiments of the present invention.

FIG. 8 depicts a block diagram 800 of a function route deductor 206 according to one or more embodiments. The function route deductor 206 can use the traverse subgraphs component 502 with traverse each core element component 504 and traverse each node component 506 to analyze subgraphs and pass node information to block 802. If a node is a page node at block 802, then a function route can be updated at a skeleton level 820. Similarly, at blocks 804, 806, 808, and 810, the node can be identified as a core element node, a core semantic element node, an action scope node, or an event to jump to another page node respectively that result in updating a function route at skeleton level 820. At block 812, if the node is an event node, the function route can be updated at an event level 818. At block 814, if the node is a property node, the function route can be updated at a property level 816. The levels 816, 818, and 820 can be combined by a build up function key router 822 and produce function route snapshots 208. The function route snapshots 208 can be associated with functions that are considered key product functions while illustrating a path to guide a user in a visualized way through multiple nodes that span multiple user interfaces in a simplified representation. For instance, rather than displaying a global graph, the key function routes to reach a property or event can be illustrated as a path through multiple user interfaces that are linked with page jumps.

As a further example, subgraphs can be traversed including each core element of each subgraph and each node related with each of the core elements in a global graph. A current node can be analyzed to determine whether the current node is a key node which can be defined in different key route levels. A key route level can be defined through different types of graph nodes such as a skeleton level 820, a properties level 816, and an event level 818. For example, the skeleton level 820 can include nodes that are page nodes, core elements, core semantic elements, action scope objects, and/or events to jump to another page. Property nodes can be captured at the properties level 816 and event nodes can be captured at the event level 818. Key nodes of the global graph can be kept while non-key nodes can be removed for a current queried level. For instance, key route for a property can be defined at the properties level 816 while a key route for an event can be defined at the event level 818. The function route snapshots 208 can be generated for a different queried levels as a simplified version (e.g., pruned) of the global graph.

FIG. 9 is a flow diagram of a method 900 of graph-based design mapping of user interface changes, in accordance with one or more aspects of the disclosure. The method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 can be performed by the user interface analysis tool 102 of FIG. 1. Accordingly, FIG. 9 is described with reference to FIGS. 1-7.

With reference to FIG. 9, method 900 illustrates example functions performed by various embodiments. Although specific function blocks ("blocks") are disclosed in method 900, such blocks are examples. That is, embodiments can perform various other blocks or variations of the blocks recited in method 900. The blocks in method 900 may be performed in an order different than presented, and not all of the blocks in method 900 may be performed. Further, method 900 can be expanded to include additional steps beyond those depicted in the example of FIG. 9, and one or more blocks can be combined or further subdivided.

Method 900 begins at block 905, where a user interface analysis tool 102 executing on a processing system analyzes a plurality of first user interfaces and a plurality of second user interfaces to extract a plurality of features of each user interface, where the second user interfaces include at least one change to the first user interfaces. For example, the first user interfaces can be the old user interfaces 104, and the second user interfaces can be the new user interfaces 114. The design analyzer 202 can perform feature extraction. In some aspects, feature extraction can include extracting identified user interface elements into structured data, code semantic elements, action scope objects, semantic correlations, and/or other features.

At block 910, the user interface analysis tool 102 generates a first graph representing the features of the first user interfaces and a second graph representing the features of the second user interfaces. For example, the first graph can be the old user interface graph 108 and the second graph can be the new user interface graph 118 generated as global graphs that combine multiple local graphs. The graph assembler 204 can perform graph generation. Generation of the first graph can include constructing a plurality of local graphs of the first user interfaces that are combined into a first global graph for an earlier version of a software product, e.g., an application or website. Generation of the second graph can include constructing a plurality of local graphs of the second user interfaces that are combined into a second global graph for a later version of the software product, e.g., an application or website, which is an update to the software product represented by the first global graph. In some aspects, a plurality of local graphs can be built using feature fusion with core sematic and action scope objects based on correlations among a plurality of elements. The first graph can be constructed as a first global graph based on a plurality of local graphs associated with the first user interfaces. The second graph can be constructed as a second global graph based on a plurality of local graphs associated with the second user interfaces.

At block 915, the user interface analysis tool 102 determines a function mapping based on a similarity calculation between the first graph and the second graph. The function mapping can be performed by the function mapper 210, for example.

At block 920, the user interface analysis tool 102 can traverse the first graph and the second graph to recommend one or more nodes for labeling based on an influence and complexity determination. Traversing and recommendations can be performed, for example, by the influence deductor 212. For instance, the node influence calculator 701 can determine whether a node from a subgraph is a core semantic element and whether the node includes an event to jump to another page, where a higher influence score can be assigned for core semantic elements than for a node with an event to jump to another page. Some nodes may have both characteristics. The complexity determination can be performed by the node complexity calculator 712 determining whether the node includes one or more factors 716 based on properties 718, events 720, brotherhood 722, jumping connections 724, and/or other such indicators of complexity. The user interface analysis tool 102 can recommend a node that satisfies an influence threshold to do limited manual labeling to help identify mapping relations between the first and second graphs based on an influence and complexity determination mechanism through traversing the first graph and the second graphs based on an influence and complexity determination where the user interface analysis tool is unable to generate a new mapping relationship using the similarity calculation between the first and second graphs. Where the similarity calculation is in a range of uncertainty, the user interface analysis tool 102 may be determine that a new mapping relationship in unable to be generated. For example, a higher similarity score, e.g., above 70%, may be identified as a similar relationship while a lower similarity score, e.g., below 25%, may be identified as a dissimilar relationship, while a similarity score in between is indeterminate. In some examples, the influence threshold may operate such that the tool 102 identifies which node has the highest influence to have satisfied the threshold, such that the node with the highest influence is recommended. In other examples, the influence threshold may be a static or calculated threshold. Nodes where the similarity calculation is below a threshold or within an indecision range (e.g., unclear whether a node is new or changed) can result in an inability to generate a new mapping relationship. The limited manual labeling can identify one or more nodes in the first graph or the second graph for labeling and subsequent use in semi-supervised machine learning. The "most influential" can be defined through one or more thresholds and can be relative to other nodes of a subgraph or portion of the first and second graphs and need not be limited to a single node.

At block 925, the user interface analysis tool 102 can update the function mapping based on the labeling. For example, when a node have a higher influence and/or complexity (e.g., above a threshold score) is identified in block 920, the node or nodes can be recommended based on scoring for labeling at block 710. After any labeling is performed at block 726, function mapping can be performed by the user interface analysis tool 102 to determine whether further updates to the mapping deductions 214 can be determined. This allows for selective manual intervention for certain nodes while avoiding manual intervention for a majority of nodes. Identifying select portions of graphs for manual labeling and/or confirmation can increase the overall accuracy of function mapping and change identification between versions of user interfaces.

At block 930, the user interface analysis tool 102 creates a visualization of the function mapping between the first user interfaces and the second user interfaces. The visualization can include a summary of mapping deductions 214, such as outputting the function mapping list 218, new function list 220, and/or obsolete function list 222 to a graphical user interface.

Further, as part of the method 900 or as a separate method as described in reference to FIG. 10, a function route deductor 206 can identify function routes through the graphs, and the function route snapshots 208 can visually display the function routes at one or more levels.

FIG. 10 depicts a flow diagram of a method 950 to perform graph-based function route snapshot determination of user interfaces, in accordance with one or more aspects of the disclosure. The method 950 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 950 can be performed by the user interface analysis tool 102 of FIG. 1. The user interface analysis tool 102 may be configured to perform either or both of methods 900 and 950. Accordingly, FIG. 10 is described with reference to FIGS. 1-9.

With reference to FIG. 10, method 950 illustrates example functions performed by various embodiments. Although specific function blocks ("blocks") are disclosed in method 950, such blocks are examples. That is, embodiments can perform various other blocks or variations of the blocks recited in method 950. The blocks in method 950 may be performed in an order different than presented, and not all of the blocks in method 950 may be performed. Further, method 950 can be expanded to include additional steps beyond those depicted in the example of FIG. 10, and one or more blocks can be combined or further subdivided.

Method 950 begins at block 905 and continues to block 910 as previously described with respect to the method 900 of FIG. 9. As such, at least a portion of the method 900 can be performed in combination with the method 950 or the graphs of method 900 can be reused by method 950. Similarly, if method 950 is performed prior to method 900, the graphs populated by method 950 can be reused by method 900 to avoid repeating the same steps for each method.

At block 965, the user interface analysis tool 102 can build a function key router defined at two or more levels that remove one or more nodes from either or both of the first graph and the second graph. The two or more levels can include a skeleton level 820 that may include one or more of a page node, a core element node, a node core semantic element node, an action scope object node, an event node to jump to a page, and/or other path defining nodes. The skeleton level 820 can provide a primary traversal route for an associated function. An event node not assigned to the skeleton level 820 can be assigned to an event level 818. The event level 818 can define actions and/or responses to actions and can extend as an aspect from the skeleton level 820. A property node can be assigned to a property level 816. The property level 816 can define information or attributes associated with a node as an extension of the skeleton level 820.

At block 970, the user interface analysis tool 102 can generate a plurality of function route snapshots based on the function key router to guide a user through a plurality of functions of a product associated with the first user interfaces and the second user interfaces as a visualization. For example, a route through a global graph can be selected based on a combination of the skeleton level 820, event level 818, and property level 816 between a starting node and an end node of the function while removing other extraneous paths that exist in the global graph but are not directly related to the function. The function route snapshots 208 can be displayed as a visualization on a graphical user interface. The function route snapshots 208 can be displayed in response to a query searching for a route associated with a key function. The display of the function route snapshots 208 can be filtered or pruned to show one or more levels associated with a key function. In some aspects, function route snapshots 208 of a same function can be displayed for both the first and second user interfaces to provide a visual comparison. Alternatively, function route snapshots 208 can be displayed for a selected version of a product, such as an earlier version associated with the first user interfaces or a later version associated with the second user interfaces.

According to an aspect, a computer-implemented method includes analyzing, by a user interface analysis tool 102 executing on a processing system, a plurality of first user interfaces and a plurality of second user interfaces to extract a plurality of features of each user interface, where the second user interfaces include at least one change to the first user interfaces. The user interface analysis tool 102 generates a first graph representing the features of the first user interfaces and a second graph representing the features of the second user interfaces. The user interface analysis tool 102 determines a function mapping based on a similarity calculation between the first graph and the second graph. The user interface analysis tool 102 recommends a node that satisfies an influence threshold (e.g., a most influential node) to do limited manual labeling to help identify mapping relations between the first and second graphs based on an influence and complexity determination through traversing the first graph and the second graph, where the user interface analysis tool 102 is unable to generate a new mapping relationship using the similarity calculation between the first and second graphs. The function mapping is updated based on the labeling. The user interface analysis tool 102 creates a visualization of the function mappings between the first user interfaces and the second user interfaces. Advantages can include visualized mapping between multiple versions of user interfaces to highlight updates. Further advantages can include increasing mapping accuracy by identifying one or more high influence and/or complexity nodes during the analysis for manual labeling, and updating mapping deductions based on the labeling. This can result in reduced manual effort by automating mapping for all but the most influential and/or complex nodes.

According to an aspect, a system includes a memory and a processing device coupled to the memory. The processing device is configured to execute instructions to analyze a plurality of first user interfaces and a plurality of second user interfaces to identify a plurality of features of each user interface, where the second user interfaces include at least one change to the first user interfaces. The processing device is further configured to execute instructions to generate a first graph representing the features of the first user interfaces and a second graph representing the features of the second user interfaces, determine a function mapping based on a similarity calculation between the first graph and the second graph, recommend a most influential node that satisfies an influence threshold to do manual labeling to help identify mapping relations between the first and second graphs based on an influence and complexity determination through traversing the first and second graphs, where a new mapping relationship is unable to be generated using the similarity calculation between the first and second graphs, update the function mapping based on the labeling, and create a visualization of the function mapping between the first user interfaces and the second user interfaces. Advantages can include highlighting function variations between multiple versions of user interfaces. Further advantages can include improved system resource utilization by automating mapping for a majority of nodes.

According to an aspect, a computer program product includes a computer readable storage medium having program instructions embodied therewith, the program instructions are executable by one or more processors to cause the one or more processors to perform operations. The operations include analyzing a plurality of first user interfaces and a plurality of second user interfaces to identify a plurality of features of each user interface, where the second user interfaces include at least one change to the first user interfaces. The operations further include generating a first graph representing the features of the first user interfaces and a second graph representing the features of the second user interfaces, building a function key router defined at two or more levels that remove one or more nodes from either or both of the first graph and the second graph, and generating a plurality of function route snapshots based on the function key router to guide a user through a plurality of functions of a product associated with the first user interfaces and the second user interfaces as a visualization. Advantages can include identifying function route snapshots through user interfaces and simplifying information captured in graphs including path routes that span multiple subgraphs to illustrate a navigation path through multiple features.

Further aspects can include where the user interface analysis tool 102 analyzes a screen snapshot of each of the first user interfaces and the second user interfaces to identify the features. Advantages can include offline user interface analysis, where screenshots captured through other user interface sessions can be separately analyzed without requiring both the user interface analysis tool 102 and the user interfaces to be used at the same time.

Further aspects can include where the influence determination is performed by determining whether a node is a core semantic element and whether the node includes an event to jump to another page. Advantages can include scaling an influence score for a node based on a potential impact of the node.

Further aspects can include where the complexity determination is performed by determining whether the node includes one or more factors based on properties, events, brotherhood, and jumping connections. Advantages can include scaling a complexity score for a node based on predetermined complexity factors.

Further aspects can include determining mapping deductions based on the function mapping that includes a function mapping list. Advantages can include generating a consolidate list of function mapping information to ensure that the user interfaces are completely analyzed and distinguish between changes and unchanged features.

Further aspects can include identifying a new function of the second user interfaces and creating a record of the new function in a new function list of the mapping deductions. Advantages can include generating a consolidated list of new functions for understanding and verification that expected new functions are included in the second user interfaces.

Further aspects can include identifying an obsolete function of the first user interfaces and creating a record of the obsolete function in an obsolete function list of the mapping deductions. Advantages can include generating a consolidated list of obsolete functions for understanding and verification that expected obsolete functions of the first user interfaces have been removed from the second user interfaces.

Further aspects can include summarizing the new function list and the obsolete function list in the visualization of one or more changes between the first user interfaces and the second user interfaces. Advantages can include automated documentation generation for changes, additions, and removal of functions in a newer version of a user interface.

Further aspects can include determining that nodes are in a skeleton level of the two or more levels, where the skeleton level can include one or more of a page node, a core element node, a core semantic element node, an action scope object node, and an event node to jump to a page. Further aspects can include where an event node is assigned to an event level of the two or more levels and/or a property node is assigned to a property level of the two or more levels. Grouping nodes in levels can provide multiple searching and pruning options for function route snapshots.

Further aspects can include performing feature extraction by extracting identified user interface elements into structured data, code semantic elements, action scope objects, and semantic correlations, building a plurality of local graphs using feature fusion and core sematic and action scope objects based on correlations among a plurality of elements, constructing the first graph as a first global graph based on a plurality of local graphs associated with the first user interfaces, and constructing the second graph as a second global graph based on a plurality of local graphs associated with the second user interfaces. Building local graphs can support construction of larger scale global graphs that span multiple user interfaces.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
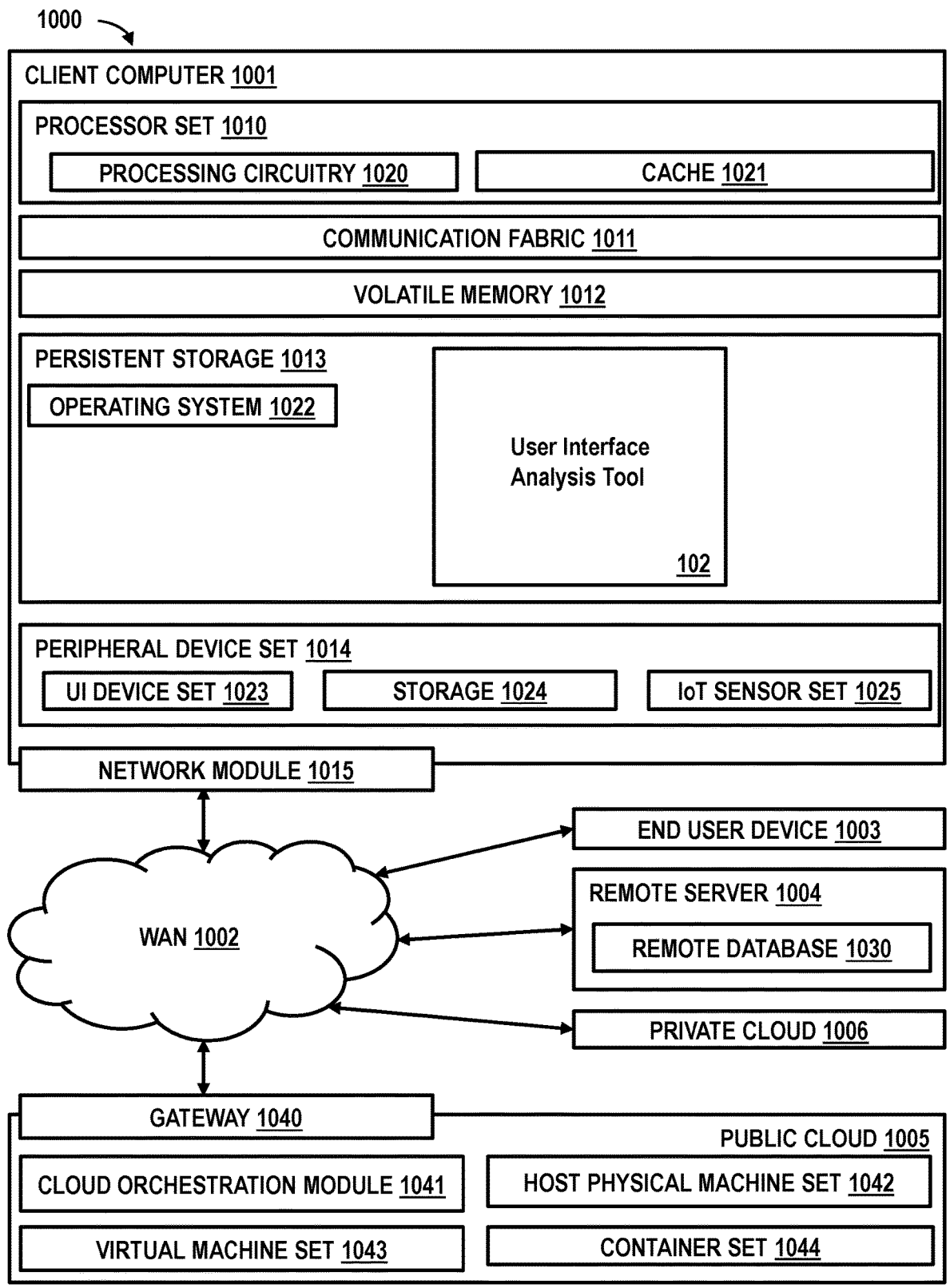
FIG. 11 depicts a block diagram of an example computing environment for use in conjunction with one or more embodiments of the present invention.

Computing environment 1000 of FIG. 11 contains an example of an environment for the execution of at least some of the computer code involved in performing the inventive methods, such as methods 900 and 950 of FIGS. 9 and 10. The computing environment 1000 can include other aspects as previously described, user interface analysis tool 102 of FIG. 1. The computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and user interface analysis tool 102, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 11. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in user interface analysis tool 102 of FIG. 1 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002. The user interface analysis tool 102 can be implemented within the remote server 1004, the public cloud 1005, the private cloud 1006, and/or elsewhere with the computing environment 1000.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
analyzing a plurality of first user interfaces of an earlier version of a software product and a plurality of second user interfaces of a later version of the software product to extract a plurality of features of each user interface by analyzing a screen snapshot of each of the first user interfaces and the second user interfaces to identify the features, wherein the second user interfaces include at least one change to the first user interfaces between the earlier version and the later version of the software product;

generating a first graph representing the features of the first user interfaces and a second graph representing the features of the second user interfaces;

determining a function mapping based on a similarity calculation between the first graph and the second graph;

recommending a node that satisfies an influence threshold to do limited manual labeling to help identify mapping relations between the first and second graphs based on an influence and complexity determination through traversing the first graph and the second graph, where a new mapping relationship is unable to be generated using the similarity calculation between the first and second graphs;

updating the function mapping based on the labeling; and creating a visualization of the function mappings between the first user interfaces and the second user interfaces.

2. The computer-implemented method of claim 1, wherein the influence determination is performed by determining whether a node is a core semantic element and whether the node includes an event to jump to another page.

3. The computer-implemented method of claim 1, wherein the complexity determination is performed by determining whether a node includes one or more factors based on properties, events, brotherhood, and jumping connections.

4. The computer-implemented method of claim 1, further comprising:

determining mapping deductions based on the function mapping comprising a function mapping list.

5. The computer-implemented method of claim 1, further comprising:

identifying a new function of the second user interfaces;

creating a record of the new function in a new function list of the mapping deductions;

identifying an obsolete function of the first user interfaces; and creating a record of the obsolete function in an obsolete function list of the mapping deductions.

6. The computer-implemented method of claim 5, further comprising:

summarizing the new function list and the obsolete function list in the visualization.

7. A system comprising:

a memory; and a processing device coupled to the memory, the processing device configured to execute instructions to:

analyze a plurality of first user interfaces of an earlier version of a software product and a plurality of second user interfaces of a later version of the software product to extract a plurality of features of each user interface by analyzing a screen snapshot of each of the first user interfaces and the second user interfaces to identify the features, wherein the second user interfaces include at least one change to the first user interfaces between the earlier version and the later version of the software product;

generate a first graph representing the features of the first user interfaces and a second graph representing the features of the second user interfaces;

determine a function mapping based on a similarity calculation between the first graph and the second graph;

recommend a node that satisfies an influence threshold to do limited manual labeling to help identify mapping relations between the first and second graphs based on an influence and complexity determination through traversing the first graph and the second graph, where a new mapping relationship is unable to be generated using the similarity calculation between the first and second graphs;

update the function mapping based on the labeling; and create a visualization of the function mapping between the first user interfaces and the second user interfaces.

8. The system of claim 7, wherein the processing device and the memory are further configured to perform the influence determination by determining whether a node is a core semantic element and whether the node includes an event to jump to another page.

9. The system of claim 7, wherein the processing device and the memory are further configured to determine complexity by determining whether a node includes one or more factors based on properties, events, brotherhood, and jumping connections.

10. The system of claim 7, wherein the processing device and the memory are further configured to determine mapping deductions based on the function mapping comprising a function mapping list.

11. The system of claim 10, wherein the processing device and the memory are further configured to:

identify a new function of the second user interfaces;

create a record of the new function in a new function list of the mapping deductions;

identify an obsolete function of the first user interfaces; and create a record of the obsolete function in an obsolete function list of the mapping deductions.

12. The system of claim 11, wherein the processing device and the memory are further configured to:

summarize the new function list and the obsolete function list in the visualization.

13. A computer program product comprising a non-transitory computer readable storage medium having program instructions embodied therewith, the program instructions executable by one or more processors to cause the one or more processors to perform operations comprising:

analyzing a plurality of first user interfaces of an earlier version of a software product and a plurality of second user interfaces of a later version of the software product to extract a plurality of features of each user interface by analyzing a screen snapshot of each of the first user interfaces and the second user interfaces to identify the features, wherein the second user interfaces include at least one change to the first user interfaces between the earlier version and the later version of the software product;

generating a first graph representing the features of the first user interfaces and a second graph representing the features of the second user interfaces;

building a function key router defined at two or more levels that remove one or more nodes from either or both of the first graph and the second graph; and generating a plurality of function route snapshots based on the function key router to guide a user through a plurality of functions of a product associated with the first user interfaces and the second user interfaces as a visualization.

14. The computer program product of claim 13, wherein a skeleton level of the two or more levels comprises one or more of a page node, a core element node, a core semantic element node, an action scope object node, and an event node to jump to a page.

15. The computer program product of claim 13, wherein an event node is assigned to an event level of the two or more levels.

16. The computer program product of claim 13, wherein a property node is assigned to a property level of the two or more levels.

17. The computer program product of claim 13, wherein the operations further comprise:
- performing feature extraction by extracting identified user interface elements into structured data, core semantic elements, action scope objects, and semantic correlations;
- building a plurality of local graphs using feature fusion and core sematic and action scope objects based on correlations among a plurality of elements;
- constructing the first graph as a first global graph based on a plurality of local graphs associated with the first user interfaces; and
- constructing the second graph as a second global graph based on a plurality of local graphs associated with the second user interfaces.

\* \* \* \* \*